(12) United States Patent
Doljack

(10) Patent No.: US 6,681,214 B1
(45) Date of Patent: Jan. 20, 2004

(54) SECURE SYSTEM FOR PRINTING AUTHENTICATING DIGITAL SIGNATURES

(75) Inventor: Frank A. Doljack, Pleasanton, CA (US)

(73) Assignee: Assure Systems, Inc., Pleasanton, CA (US)

( * ) Notice: Subject to any disclaimer, the term of this patent is extended or adjusted under 35 U.S.C. 154(b) by 0 days.

(21) Appl. No.: 09/342,489

(22) Filed: Jun. 29, 1999

(51) Int. Cl.$^7$ ............................................. G06F 17/60
(52) U.S. Cl. ........................... 705/75; 705/64; 705/410
(58) Field of Search ............................. 705/75, 64, 410

(56) References Cited

U.S. PATENT DOCUMENTS

| | | |
|---|---|---|
| 3,833,795 A | 9/1974 | Shoshani et al. |
| 4,463,250 A | 7/1984 | McNeight et al. |
| 4,879,747 A | 11/1989 | Leighton et al. |

(List continued on next page.)

FOREIGN PATENT DOCUMENTS

| | | |
|---|---|---|
| EP | 266748 A2 | 5/1988 |
| EP | 360225 A2 | 3/1990 |
| EP | 782112 A2 | 7/1997 |
| WO | WO8403019 | 8/1984 |
| WO | WO9322745 | 11/1993 |
| WO | WO 98 03904 | 1/1998 |
| WO | WO9904364 | 1/1999 |

OTHER PUBLICATIONS

Sony Digital Cameras, Sony, pp. 1 to 2.
Vaio C1 Picturebook Notebook Computer, PCG–C1X, pp. 1 to 3.

(List continued on next page.)

*Primary Examiner*—James P. Trammell
*Assistant Examiner*—Jalatee Worjloh
(74) *Attorney, Agent, or Firm*—Renner, Otto, Boisselle & Sklar, LLP

(57) ABSTRACT

The present invention includes a method of securing one or more product indicia for use in authenticating products or collecting a tax and includes generating one or more product indicia and encrypting the one or more product indicia with a public encryption key. The product indicia are then transferred to an indicia application location for application of the one or more product indicia to one or more products and processed securely while applying the one or more product indicia to the one or more products to thereby prevent tampering, misuse or theft of the product indicia at the indicia application location. The present invention also.includes a system for securing product indicia for use in authentication of products or collecting a tax and includes a processor and a read/write memory associated with the processor. The read/write memory stores therein a product indicia file which contains one or more product indicia in an encrypted form. In addition, the read/write memory stores therein a private key file containing a private encryption key in an encrypted form which is associated with a public encryption key which is used to encrypt the product indicia in the product indicia file. A code-protected device is also associated with the processor and stores therein a code-protected encryption key which is used to encrypt and decrypt the private encryption key in the read/write memory. Further, the code-protected encryption key can not be deciphered without rendering the code-protected memory inoperable. A printing device is also associated with the processor and the processor is configured to utilize the code-protected encryption key to decrypt the private encryption key, use the decrypted private encryption key to decrypt the one or more product indicia in the product indicia file, and transfer the decrypted one or more product indicia to the printing device for printing thereof.

53 Claims, 6 Drawing Sheets

U.S. PATENT DOCUMENTS

| | | |
|---|---|---|
| 4,889,365 A | 12/1989 | Chouinard |
| 4,938,591 A | 7/1990 | Anderson et al. |
| 4,995,082 A | 2/1991 | Schnorr |
| 5,140,634 A | 8/1992 | Guillou et al. |
| 5,164,988 A | 11/1992 | Matyas et al. |
| 5,367,148 A | 11/1994 | Storch et al. |
| 5,422,954 A | 6/1995 | Berson |
| 5,481,610 A | 1/1996 | Doiron et al. |
| 5,540,153 A * | 7/1996 | Campbell et al. ........... 101/493 |
| 5,592,561 A | 1/1997 | Moore |
| 5,598,477 A | 1/1997 | Berson |
| 5,673,338 A | 9/1997 | Denenberg et al. |
| 5,721,781 A | 2/1998 | Deo et al. |
| 5,745,678 A * | 4/1998 | Herzberg et al. ........... 395/186 |
| 5,754,656 A | 5/1998 | Nishioka et al. |
| 5,768,384 A | 6/1998 | Berson |
| 5,771,392 A * | 6/1998 | Razdow ................. 395/800.06 |
| 5,801,856 A | 9/1998 | Moghadam et al. |
| 5,818,021 A | 10/1998 | Szewczykowski |
| 5,822,739 A * | 10/1998 | Kara .......................... 705/410 |
| 5,845,070 A | 12/1998 | Ikudome |
| 5,850,442 A | 12/1998 | Muftic |
| 5,892,441 A | 4/1999 | Woolley et al. |
| 5,903,721 A | 5/1999 | Sixtus |
| 5,912,974 A * | 6/1999 | Holloway et al. ............ 380/51 |
| 5,971,435 A | 10/1999 | DiCesare et al. |
| 6,069,955 A | 5/2000 | Coppersmith et al. |
| 6,073,114 A | 6/2000 | Perkins, III et al. |
| 6,078,888 A | 6/2000 | Johnson, Jr. |
| 6,105,004 A | 8/2000 | Halperin et al. |
| 6,188,997 B1 * | 2/2001 | Ratzenberger, Jr. et al. 705/410 |
| 6,212,638 B1 | 4/2001 | Lee et al. |
| 6,226,619 B1 | 5/2001 | Halperin et al. |
| 6,247,047 B1 | 6/2001 | Wolff |
| 6,252,963 B1 | 6/2001 | Rhoads |
| 6,266,416 B1 * | 7/2001 | Sigbjornsen et al. ........ 380/255 |
| 6,269,445 B1 | 7/2001 | Nishioka et al. |
| 6,286,761 B1 | 9/2001 | Wen |
| 6,397,194 B1 | 5/2002 | Houvener et al. |
| 6,442,276 B1 | 8/2002 | Doljack |

OTHER PUBLICATIONS

"Point Of Sale Transaction Logging Scheme, Apr. 1980." IBM Technical Disclosure Bulletin, vol. 22. No. 11, Apr. 1980, pp. 5046–5049, XP002084211, New York, US.

Menezes, Alfred J., Paul C van Oorschot, Scott A. Vanstone "Handbook of Applied Cryptography", 1997, p. 401.

* cited by examiner

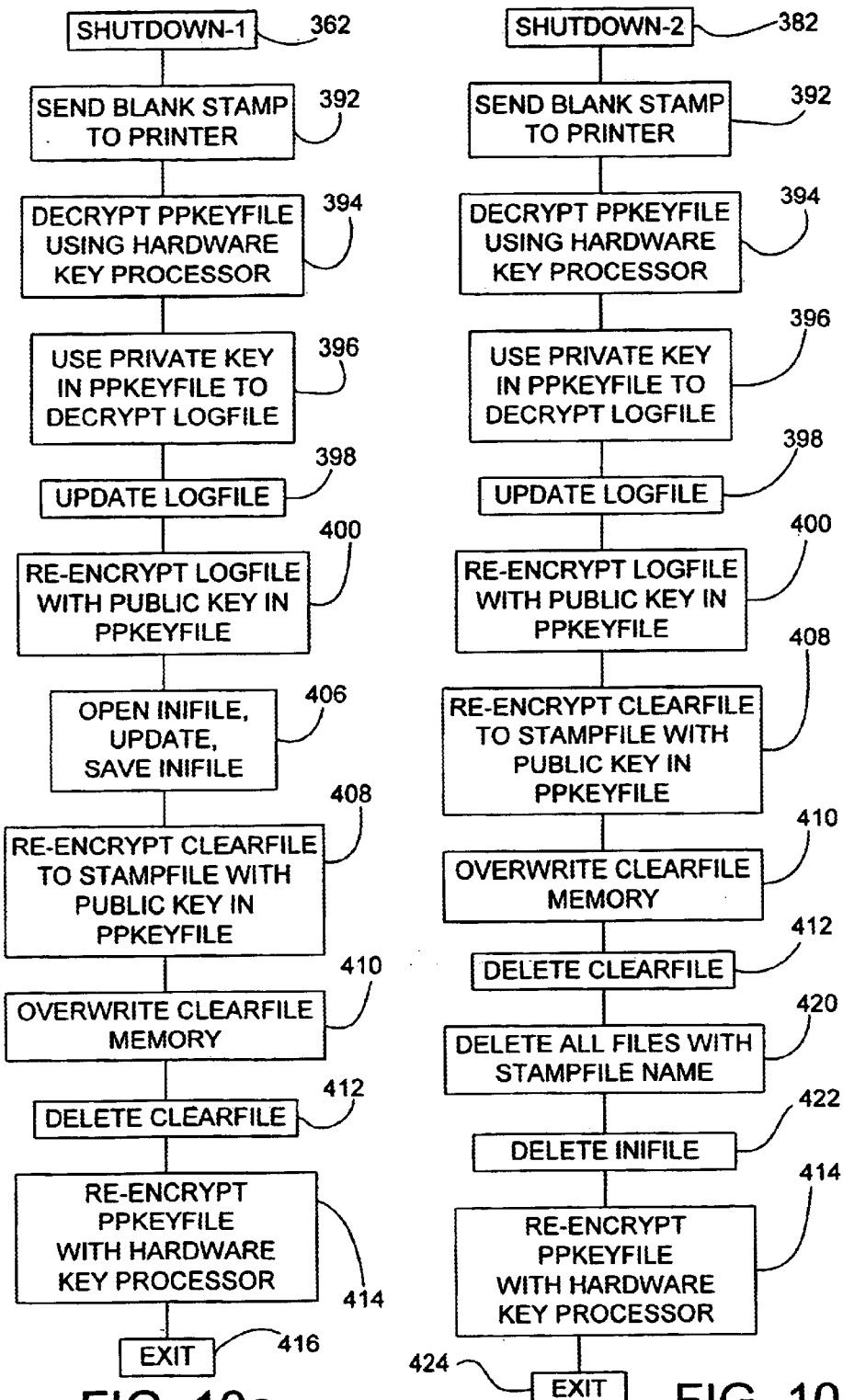

SECURE SYSTEM FOR PRINTING AUTHENTICATING DIGITAL SIGNATURES

FIELD OF THE INVENTION

The present invention relates generally to system and method for the verification of authenticity of goods or the payment of excise taxes associated therewith. More particularly, the invention relates to a system and method of securing one or more product indicia for use in authenticating products or collecting a tax.

BACKGROUND OF THE INVENTION

Many types of mass produced products have various taxes such as excise taxes which are levied on the product at either the federal level, the state level, or both. For example, cigarettes are subject to varying levels of taxation in different states across the United States. Consequently, tax stamps, which are applied to the cigarettes and indicate that the appropriate tax has been paid, are not applied to the products at the manufacturer or product origination site. Instead, the manufacturer ships the products to the various wholesalers who then buy tax stamps associated with the federal and/or unique state tax and apply the tax stamps to the product. The cost associated with the tax is then passed on to the retailers and ultimately to the consumers.

Because the tax associated with some products such as cigarettes is extremely high, there is an incentive for fraudulent activities to occur; for example, an individual may steal a large quantity of valid tax stamps, or duplicate valid tax stamps. Clearly, in such circumstances, a dishonest individual or individuals can apply stolen or duplicate tax stamps to the goods without paying taxes and either charge retailers the full price, thereby pocketing the entire profit associated with the tax, or split the "lost tax" profits with unscrupulous retailers. Consequently, various methods and systems have been developed to thwart such illegal activities.

Once such methodology which has been developed to minimize counterfeiting is public key cryptography. Public key cryptography is a common protocol which is used to provide the authenticity of a message and involves encrypting a message or code with a private key portion of a public-private key pair. The corresponding public key portion is then provided to the party who generally will use it to decrypt the message or code back to its original form (typically a plain text message or code). Therefore, so long as the sender of the message or code keeps the private key secret, anyone decrypting the message or code is certain the message or code came from the sender if the plain text message or code is successfully reconstructed.

In the cigarette tax stamp example, the public key cryptography protocol is used to authenticate the tax stamp on the cigarettes in the following way, as illustrated in prior art FIG. 1. In one example, cigarettes 10 are manufactured at a manufacturer's site 12 without the application of a tax stamp because each wholesaler location may have different excise tax requirements. The cigarettes 10 are then shipped to a wholesale site 14, at which point a tax stamp 16 is applied to the cigarettes 10 in the form of a digital signature. The digital signature typically is an encrypted code or message and is unique; that is, each digital signature is one-of-a-kind and no duplicates are made.

The cigarettes 10 are then sold and distributed to various retailers 18 for the ultimate sale to consumers. A person who makes use of the tax stamp 16 on the cigarettes 10, for example, a tax inspector, travels to various retail sites 18 and inspects the digital signatures 16 with a reading device 20, such as a bar code reader, etc. The tax inspector inspects the tax stamp 16, for example, by decrypting it using the associated public key in order to ascertain its origin. Further inspection of other similarly marked products provides a check for uniqueness. Therefore the inspector checks to see that the digital signature 16 is a valid code and that the code has not been used previously (i.e., is not a counterfeit).

Although the above-described public key cryptography system and method is reliable and modestly effective, it is always desirable to further improve such systems and methods.

SUMMARY OF THE INVENTION

The present invention relates to a system and method of securing authentication or tax collection indicia for various goods at an indicia application location such as a wholesale distribution site. The indicia preferably reside in a file and are secured by employing encryption technology to the indicia and by further encrypting a private encryption key used to decrypt such indicia at an indicia application location. The encrypted private key is decrypted at the indicia application location with a code-protected key that can not be deciphered or otherwise read and thus serves to protect the indicia from theft, tampering or duplication. Upon decrypting the private encryption key with the code-protected key, the private encryption key is used to decrypt the encrypted indicia, which are then applied to the goods.

The present invention further includes employing an encrypted logfile at the indicia application location. The logfile preferably includes use information which indicates the names of various indicia files which have been processed at the indicia application location and/or the times at which such processing occurred. The logfile also preferably includes at least one indicia from each of the previously processed indicia files. The encrypted logfile is decrypted at the indicia application location with a private encryption key and used to evaluate the integrity of the indicia file. The integrity is checked, for example, by determining whether the indicia file contains duplicate product indicia by comparing the decrypted product indicia file to the list of indicia from previously processed files. If a match is found then at least some of the indicia within the file are not unique and evidence of misuse, tampering or theft has been identified.

The present invention also includes improved security of the authentication or tax collection indicia in the indicia application process. Upon decryption of the indicia file, one or more indicia are applied to the various goods, for example, via printing. After each indicia is printed, the memory location within the indicia file at which the printed indicia resided is overwritten with other data such as a null data set to effectively "destroy" all indicia after they have been used. In addition, upon the discontinuation of printing when the file has not been completely utilized. (the file still contains unused indicia), the remaining indicia are re-encrypted and stored to maintain the security thereof.

According to one aspect of the present invention a method of securing one or more product indicia for use in authenticating products or collecting a tax is disclosed. The method includes generating one or more product indicia and encrypting the one or more product indicia with a public encryption key to form an encrypted indicia file. Subsequently, the indicia file is transferred to an indicia application location for application of the one or more product indicia to one or more products, respectively. The product indicia are processed securely while applying the one or more product indicia to the one or more products, thereby preventing a tampering, misuse or theft of one or more product indicia at the indicia application location.

According to one embodiment of the present invention, the product indicia are processed securely by decrypting an encrypted private key associated with the encrypted indicia using a code-protected key at the indicia application location. The product indicia are then decrypted using the private key and are applied to the one or more products, respectively.

According to another aspect of the present invention, a system for securing one or more product indicia for use in authentication of products or collecting a tax is disclosed. The system includes a processor and a read/write memory associated with the processor. The read/write memory stores therein a product indicia file in an encrypted form which contains one or more product indicia. The read/write memory also includes a private key file which contains a private: encryption key in an encrypted form. The encrypted private encryption key is associated with a public encryption key used to encrypt the product indicia in the product indicia file.

The system also includes a code-protected hardware encryption key and dedicated processor associated with the processor. The code-protected hardware encryption key and dedicated processor stores therein a code-protected encryption key which is used to encrypt and decrypt the private encryption key in the read/write memory. The code-protected encryption key cannot be deciphered, read or otherwise reverse-engineered without rendering the code-protected memory inoperable.

A printing device is also associated with the processor. The processor is configured to utilize the code-protected encryption key to decrypt the private encryption key and use the decrypted private encryption key to decrypt the one or more product indicia in the product indicia file and the logfile. The processor is further configured to transfer the decrypted one or more product indicia to the printing device for printing thereof. In the above manner, the system effectuates a secure transfer of the product indicia to the goods without a threat of misuse, tampering or theft.

To the accomplishment of the foregoing and related ends, the invention comprises the features hereinafter fully described and particularly pointed out in the claims. The following description and drawings set forth in detail certain illustrative embodiments of the invention. These embodiments are indicative, however, of merely a few of the various ways in which the principles of the invention may be employed. Other objects and advantages of the invention will become apparent from the following detailed description of the invention when considered in conjunction with the drawings.

BRIEF DESCRIPTION OF THE DRAWINGS

FIGS. 10a and 10b are flow chart diagrams illustrating steps involved in securing the product indicia when the product indicia application process is discontinued according to the present invention.

DETAILED DESCRIPTION OF THE INVENTION

Although public key cryptography systems and methods are modestly effective at preventing fraud associated with tax stamps or similar product authentication methods, it has been discovered by the inventor of the present invention that such a prior art system relies upon the security of the printing process at the wholesaler site 14 (or other code application site) to be effective. That is, from the moment that the digital signatures or codes are created until the moment the digital signatures or codes are printed and applied to the product, the digital signatures or codes may be stolen. It is in this critical path that fraud will be most effective, because once codes are applied to products and the products are released into the various channels of distribution (such as to retail outlets) a counterfeiter must expend a great deal of effort to copy many of the valid codes because many such valid codes are necessary in order to lower the probability that a tax inspector or other type inspector will detect the duplicate digital signatures or codes.

In contrast, between the time at which the digital signatures or codes are created and the time at which they are applied to the products, a large number of valid codes are concentrated in a computer file which is used as the input for the printing process. Consequently, theft of the digital signatures or codes at this juncture is advantageous to the thief or counterfeiter. Therefore it has been recognized by the inventor of the present invention that a system and method must be provided that makes it extremely difficult for a thief to obtain the valid digital signature or code file between the time the file is created and the time the file is used to apply the digital signatures or codes to the products.

Figure 1:
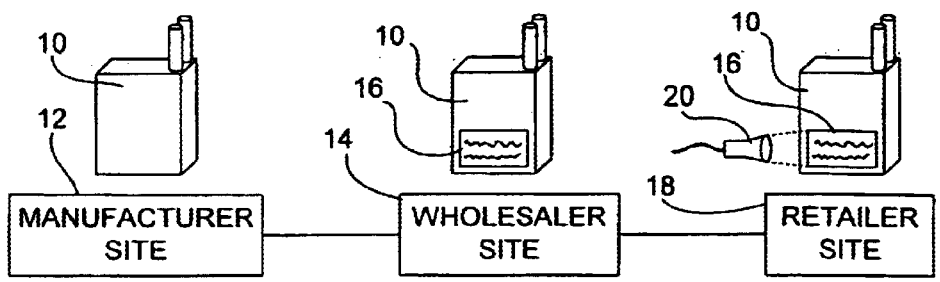
FIG. 1 is a prior art block diagram illustrating a chain of distribution for a product such as cigarettes.
Figure 2:
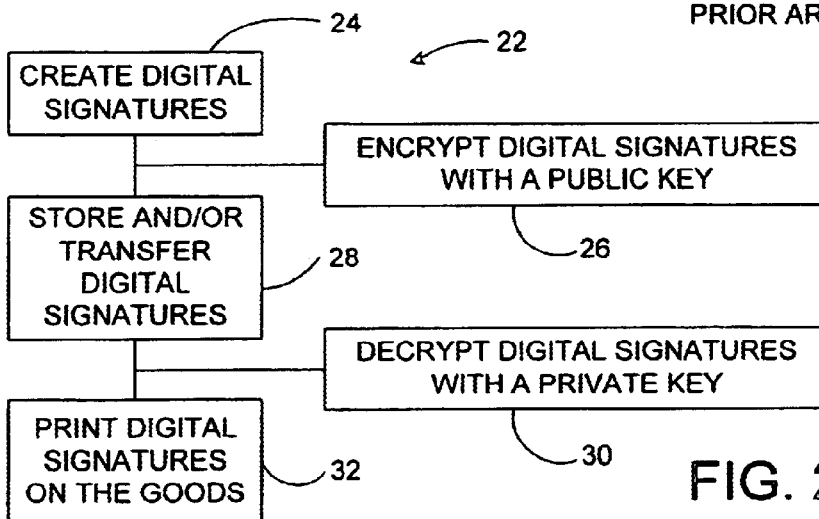
FIG. 2 is a prior art flow chart diagram illustrating a method of preventing fraud relating to authentication or tax collection indicia.

One manner or method 22 of improving the security of such digital signatures or codes is illustrated in FIG. 2. A set of tax stamps or digital signatures are generated 24, for example, at a manufacturer site or by a government agency and sold to wholesalers. Prior to the transfer of the tax stamps, however, the file containing the codes is encrypted with a public encryption key 26. The encrypted file of tax stamps or codes are then transferred to the wholesaler 28, at which point they are stored until they are applied to the various goods. The encrypted codes are then decrypted at the wholesaler site 30 using a private encryption key which is associated with the public encryption key used to encrypt the codes. The decrypted tax stamps or codes are then applied to the goods at wholesaler site 32, for example, by printing.

The above method 22 improves the security of the codes because theft of the codes by a third party generally is ineffective. Such a theft is ineffective because without the private encryption key (which only the wholesaler possesses) the stolen codes are useless because they are encrypted. Unfortunately, the method 22 of FIG. 2 assumes that a wholesaler site is secure, which often is not the case. For example, many wholesaler sites are warehousing operations which typically are not secure facilities. Therefore a third party may be able to enter the wholesaler site and steal both the codes and the appropriate private encryption key. Alternatively, the wholesaler himself or the wholesaler's employees may be unscrupulous and either steal and/or copy such codes. Therefore the present invention further improves the security of tax stamps or other authentication indicia over the method 22 of FIG. 2 by making theft or fraud at the wholesaler site (or, other indicia application location) more difficult.

The present invention will now be described with reference to the drawings, wherein like reference numerals are used to refer to like elements throughout. The present invention relates to a system and method of securing authentication or tax collection indicia such as digital signatures so as to eliminate theft or fraud associated with such indicia. Digital signatures are encrypted within a file using a public encryption key and the encrypted file is then either physically or electronically transmitted to an indicia application location such as a wholesaler site.

A private key which is used to decrypt the digital signature file is itself encrypted and may be transferred along with the digital signature file, or alternatively may be kept at the indicia application location. The encrypted private key is decrypted with a code-protected hardware encryption key and dedicated processor, wherein the key may reside in memory such as a mask programmed read-only memory device at the indicia application location. The code-protected key provides enhanced security at the indicia application location because attempting to decipher, read or otherwise reverse-engineer the code-protected key is either impossible or renders the key inoperable. The decrypted private key is subsequently used to decrypt the encrypted digital signature file and the digital signatures are then applied to the various goods. The present invention also includes additional security features which will be discussed in greater detail below.

Figure 3:
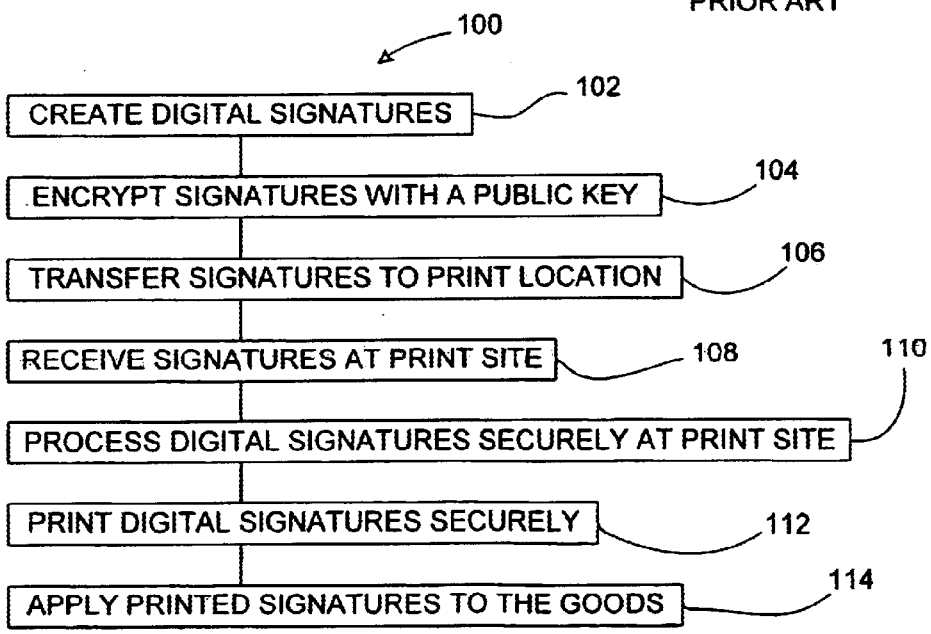
FIG. 3 is a flow chart diagram illustrating a method of securing product indicia for use in authenticating products or collecting a tax according to the present invention.

A method 100 of marking goods securely for authentication or tax collection purposes is illustrated in FIG. 3. Initially, a plurality of product indicia such as bar codes, alphanumeric codes, two-dimensional digital signatures, etc. are generated 102 at a site remote from the indicia application location. Preferably the generation or origination site for authentication-type indicia is at or associated with the manufacturer of the goods while tax collection-type indicia will be generated at or associated with a government agency or entity, however, other sites are contemplated by the present invention. The product indicia are then encrypted 104 with a public encryption key. The public encryption key is preferably one portion of a public/private encryption key pair, wherein the associated private encryption key will be transferred along with the indicia or be located at the indicia application location.

The one or more product indicia are contained within a product indicia file and are transferred 106 to the indica application location, such as a wholesaler site. Alternatively, the indica application location may include any location at which the product indicia are applied to the goods, for example, retail location, etc. Such a file transfer may occur either physically or electronically, such as over a modem or via the Internet or other type data network. Any manner of transferring the product indicia file to the indicia application location may be utilized and is contemplated as falling within the scope of the present invention.

The product indicia file is then received 108 at the indicia application location and stored in a memory device. When the application of the product indicia to the goods commences, the product indicia are processed securely 110 at the indicia application location such that the private encryption key used to decrypt the product indicia file cannot be read, deciphered or otherwise used to effectuate an unauthorized decryption of the product indicia. Consequently, step 110 prevents a theft, tampering or misuse of the product indicia at the indicia application location.

Once processed securely at step 110, the product indicia are printed securely at step 112 and then applied to the goods 114. Although the method 100 illustrates the printing and application steps 112, 114 as separate steps, such as printing a product indicia on a label and applying the label to the goods, the steps 112, 114 may alternatively include a single application step wherein the product indicia is applied directly to the goods.

The secure printing step 112 includes printing the product indicia and subsequently destroying the product indicia within the product indicia file after its use. According to an exemplary embodiment of the present invention, the used product indicia is destroyed after its use by overwriting the data location in memory where the product indicia resides with data that does not correspond to any product indicia, for example, a null data set. Alternatively, any method of eliminating or otherwise removing the product indicia from its memory location after its use may be utilized and is contemplated as falling within the scope of the present invention.

Figure 4:
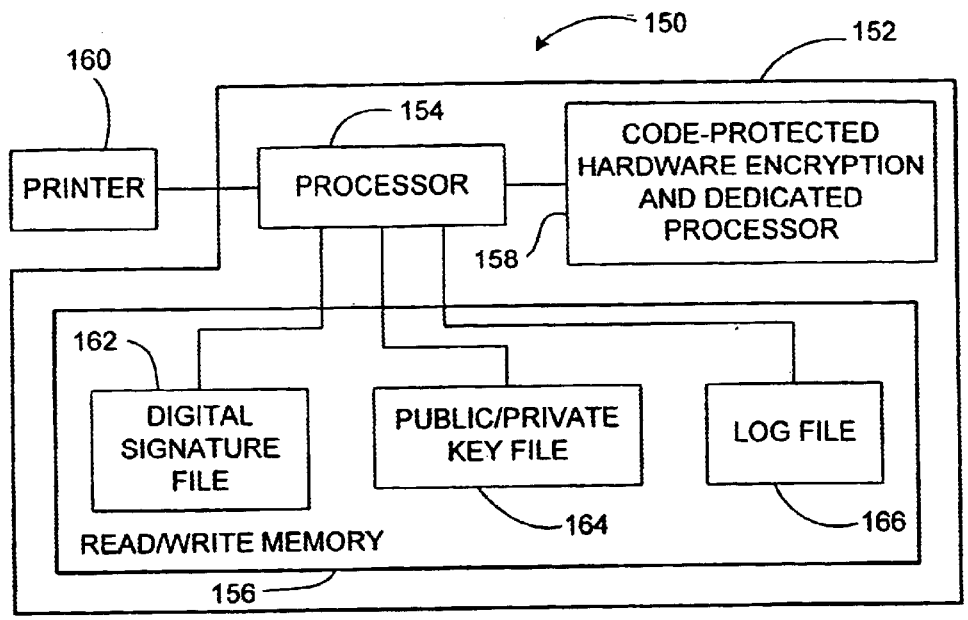
FIG. 4 is a block diagram illustrating a system for securing product indicia for use in authenticating products or collecting a tax according to the present invention.

A system for securing product indicia for authentication or tax collection purposes is illustrated in FIG. 4 at reference numeral 150. The system 150 preferably includes a computer 152 having a processor 154 with a read/write memory 156 and a code-protected memory 158 associated therewith, preferably via a direct electrical connection. The processor 154 preferably is an X86 type processor, however, other type processors having differing architectures may be utilized and are contemplated as falling within the scope of the present invention. The read/write memory 156 preferably is a conventional volatile memory or non-volatile memory such as a RAM or a hard-disk drive, etc. which allows data to be written to and read therefrom.

The code-protected hardware encryption key and dedicated processor or unit 158 preferably includes a mask programmed read-only memory device or alternatively is a burned-in programmable ROM. One commercially available product which may be utilized, for example, is the Cylink PrivateCard manufactured by Cylink, Inc., located at 910 Hermosa Court, Sunnyvale, Calif. 94086, although other products may be utilized and are contemplated as falling within the scope of the present invention. The code-protected hardware encryption key and dedicated processor 158 is code-protected in the sense that the instruction set contained within the memory (once written thereto) cannot be read, deciphered or otherwise reverse-engineered without rendering the device inoperable. For example, in order to ascertain the data of a mask programmed read-only memory that possesses no external data output lines, one must reverse-engineer the device, that is, de-cap and destructively analyze the device using semiconductor failure analysis type techniques. Such analysis, however, destroys the device; therefore although the data has been identified, such knowledge is not beneficial because the device associated with the data is now inoperable. Although a mask programmed read-only memory device having data which is burned into the hardware is the preferred device, any type of code-protected memory device which prohibits one from reading or otherwise deciphering the data may be utilized and is contemplated as falling within the scope of the present invention.

A printing device 160, such as a printer, is also associated with the processor 154, preferably via an electrical connection, and is operable to apply product indicia to the goods. The printing device 160 may apply the product indicia to labels which are subsequently applied to goods or alternatively may be a direct application device. In such a case, the application may consist of a printing process or may consist of a more sophisticated device such as a laser, etc. Any form of product indicia application device may be utilized and is contemplated as falling within the scope of the present invention.

The system 150 according to a preferred embodiment of the present invention operates to secure product indicia at an indicia application location in the following manner. The computer 152 is preferably located at a product indicia application location such as a wholesaler distribution site and receives one or more product indicia from an origination location (e.g., a manufacturer site or a government agency). Preferably, the computer 152 receives such indicia electronically via a modem (not shown) or a data network such as the Internet. Alternatively, however, the indicia may be received physically by shipping the indicia which are stored in a traditional storage medium such as a diskette or CD and downloaded to the read/write memory 156 via a disk drive (not shown). In any event, the product indicia are stored in the read/write memory 156 as a digital signature file 162.

As discussed supra, the product indicia or digital signatures in the digital signature file 162 are encrypted preferably with a public encryption key. A private key file 164 also exists within the read/write memory 156 and contains the private encryption key associated with the public encryption key which was used to encrypt the digital signatures in the digital signature file 162. According to an exemplary embodiment of the present invention, the private encryption key is sent to the indicia application location bundled with the digital signature file 162.

The private encryption key is itself encrypted to prevent an unauthorized use or theft of the key. The encrypted private encryption key in the private key file 164 is decrypted by the processor 154 using an encryption key within the code-protected memory 158. Thus, when a command is given to the computer 152 to initiate printing of a product indicia (via, for example, an input peripheral (not shown)), the processor 154 utilizes an encryption key within the private key file 164 and uses the private encryption key to decrypt the product indicia or digital signatures within the digital signature file 162 and sends the digital signatures to the printing device 160 for application to the goods.

The code-protected hardware encryption key and dedicated processor 158 provides additional security of the product indicia over prior art systems by eliminating any benefit associated with a theft of the digital signature file 162 and the private key file 164. Because the private encryption key within the private key file 164 is encrypted, one cannot decrypt the digital signature file. Further, an attempt to steal the encryption key within the code-protected hardware encryption key and dedicated processor 158 is ineffective because the instruction set containing the encryption key therein cannot be read, deciphered or otherwise determined without rendering the unit 158 inoperable. Only the dedicated processor associated with the code-protected hardware encryption key can decrypt the private encryption key in the private key file 164. Consequently, only the computer 152 at the indicia application location can apply the indicia to the goods because the processor 154 and the code-protected hardware encryption key and dedicated processor 158 are inseparable with regard to their functionality.

According to one exemplary embodiment of the present invention, the processor 154 and the code-protected hardware encryption key and dedicated processor 158 can be thought of as a specialized state machine that contains therein an embedded encryption key which maintains certain files in an encrypted state when they are not being used by the state machine and its processes. This encryption key can be either a symmetric secret key or may itself consist of a public/private key pair. In either case, the key or keys are embedded.within the state machine's instruction set and the instruction set is "burned" into a persistent storage device which is part of the physical machine which comprises the state machine. Because the persistent storage device is code-protected, it can be written to once, but cannot be subsequently read without destructive analysis, thus making the processor 154 and the code-protected hardware encryption key and dedicated processor 158 inseparable. The instruction set cannot be copied and thus the state machine at the indicia application location may be made unique from any other computer.

According to a preferred embodiment of the present invention, the system 150 may provide for security of product indicia at the indicia application location using a logfile 166 within the read/write memory 156. The logfile 166 preferably contains a record of user information so that by examining the logfile 166, one can ascertain the times at which the digital signature file 162 was accessed as well as the times at which the logfile 166 was accessed. Such information may prove useful if tampering or misuse of the digital signature file 162 and/or the logfile 166 is suspected. In addition, the logfile 166 contains at least one product indicia or digital signature from each previously processed digital signature file. For example, for each digital signature file 162 that gets transferred to the indicia application location for use, at least one of the digital signatures gets copied and saved in the logfile:166. The list of previously processed digital signatures is then compared to a new digital signature file 162 (after the digital signature file is decrypted). If a match occurs during the comparison, then the processor 154 raises a flag and/or discontinues the indicia application process because such a match indicates that the digital signature file 162 is a counterfeit file since each of the digital signatures within each digital signature file are supposed to be unique.

According to a preferred embodiment of the present invention, the logfile 166 is itself encrypted with an encryption key which is contained within the encrypted public/private key file 164 (either the same encryption key used to encrypt/decrypt the product indicia or its own separate key therein). Consequently, one cannot open or tamper with the logfile 166. Instead, the only way to process the product indicia or digital signatures in the digital signature file 162 using the logfile 166 is by first decrypting the logfile 166 via the processor 154 and a key within the public/private key file 164 (upon the file 164 being decrypted). In addition, according to a preferred embodiment of the present invention, prior to the re-encryption of the logfile 166, the dedicated processor within unit 158 provides a version number which is added to the logfile 166. In addition, each time the logfile 166 is subsequently encrypted, the version number is changed (for example, by being incremented, altered with a random number or changed according to a predetermined algorithm) and saved in the code protected memory in the unit 158.

Upon the logfile 166 being decrypted, the processor 154 compares the list of previously processed digital signatures to the decrypted digital signature file 162 and if no matches are found, the system 150 continues and applies the digital signatures to the goods via the printing device 160.

The encrypted logfile 166 provides the following advantages. It is desirable to inspect the logfile 166 from time to time by the authority that issues the digital signature files in order to determine whether unapproved activity has occurred with the system. To inspect the logfile 166, the digital signature issuing authority keeps for itself a copy of the private or secret key which is used to encrypt the logfile 166 so that an inspection can take place. In the unlikely event that the private or secret key used to decrypt the logfile 166 is stolen, system security can be restored relatively easily by simply replacing the present public/private key file with a new such file. Therefore by encrypting the logfile 166 with a key within the public/private key file 164 provides for ease of inspection and easily allows a restoration of system security in the event that the key is stolen.

The encrypted logfile 166 which is encrypted by a key within the public/private key file 164 and appended with a version number or symbol also provides another security advantage. In the event that an unscrupulous individual makes a copy of the digital signature file 162 and the logfile 166, the user could subsequently attempt to put the copied files back onto the system 150 and re-use the digital signature file 162, thinking that the system 150 will not detect the re-use because the current logfile 166 was replaced by the previously saved copy. By encrypting the logfile 166 with a key within the public/private key file 164 and regularly changing the version number in the logfile 166 each time it is re-encrypted, any logfile which upon decryption has a version number or symbol which is not the expected current version number or symbol as dictated by the unit 158 will cause a denial of printing services. Therefore no one can save a copy of the digital signature file 162, encrypted logfile 166 and its associated public/private key file 164 for re-use at a later time.

According to an alternative embodiment of the present invention, the logfile 166 is encrypted and the encryption key used to decrypt the logfile 166 is contained within the code-protected hardware encryption key and dedicated processor 158 (either the same memory 158 as discussed supra or a similar type memory). Consequently, one cannot open or tamper with the logfile 166. Instead, the only way to process the product indicia or digital signatures in the digital signature file 162 using the logfile 166 is by first decrypting the logfile 166 via the processor 154 and the code-protected 10 hardware encryption key and dedicated processor 158. Upon being decrypted, the processor 154 compares the list of previously processed digital signatures to the decrypted digital signature file 162 and if no matches are found, the system 150 continues and applies the digital signatures to the goods via the printing device 160.

Figure 5:
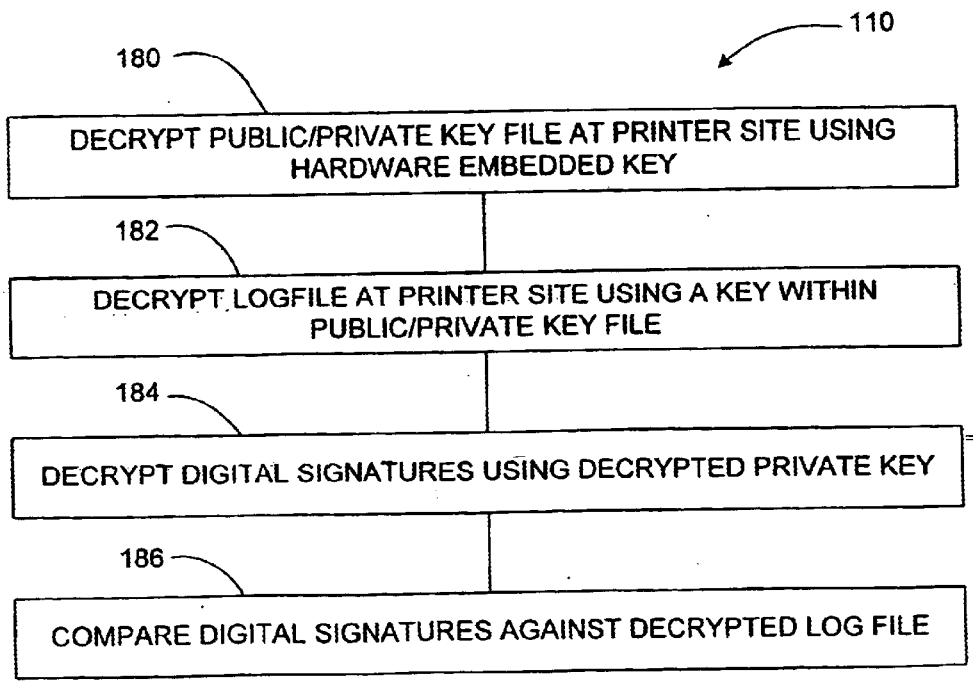
FIG. 5 is a flow chart diagram illustrating steps involved in processing the product indicia securely at the indicia application location according to the present invention.

Returning now to the method 100 of FIG. 3, the step 110 of processing the product indicia securely at the indicia application location according to a preferred embodiment of the present invention will now be described in greater detail in conjunction with FIGS. 4 and 5. The secure processing step 110 preferably starts at step 180 by decrypting the public/private key file 164 at the indicia application location using a code-protected encryption key such as the hardware embedded key (e.g., a mask programmed read-only memory device having a :burned-in instruction set). For example, the processor 154 utilizes the encryption key in the code-protected hardware and dedicated processor 158 to decrypt the public/private key file 164 in the read/write memory 156. Subsequently, the logfile 166 is decrypted at the indicia application location using a key within the public/private key file 164 at step 182.

The decrypted public/private key file 164 includes the public/private encryption key pair associated with the public key used to encrypt the digital signature file 162 and is then used by the processor 154 to decrypt the digital signature file at step 184. The decrypted digital signature file 162 includes therein one or more product indicia or digital signatures for use in application to the goods. After the digital signature file 162 is properly decrypted, the processor 154 compares the product indicia or digital signatures therein to the decrypted logfile 166 which contains the list of previously processed indicia or digital signatures at step 186. If the processor 154 finds a match, then the indicia or digital signatures within the digital signature file 162 are not unique and the processor 154 provides an indication to either a user or security personnel at the indicia application location or to security personnel at the origination location, or both as may be desired, and discontinues the method 100 to prevent misuse. If, however, no match is found, the processor 154 determines that the digital signature file 162 is authentic and the method 100 of FIG. 3 proceeds to step 112 to effectuate a secure printing of the indicia.

Figure 6:
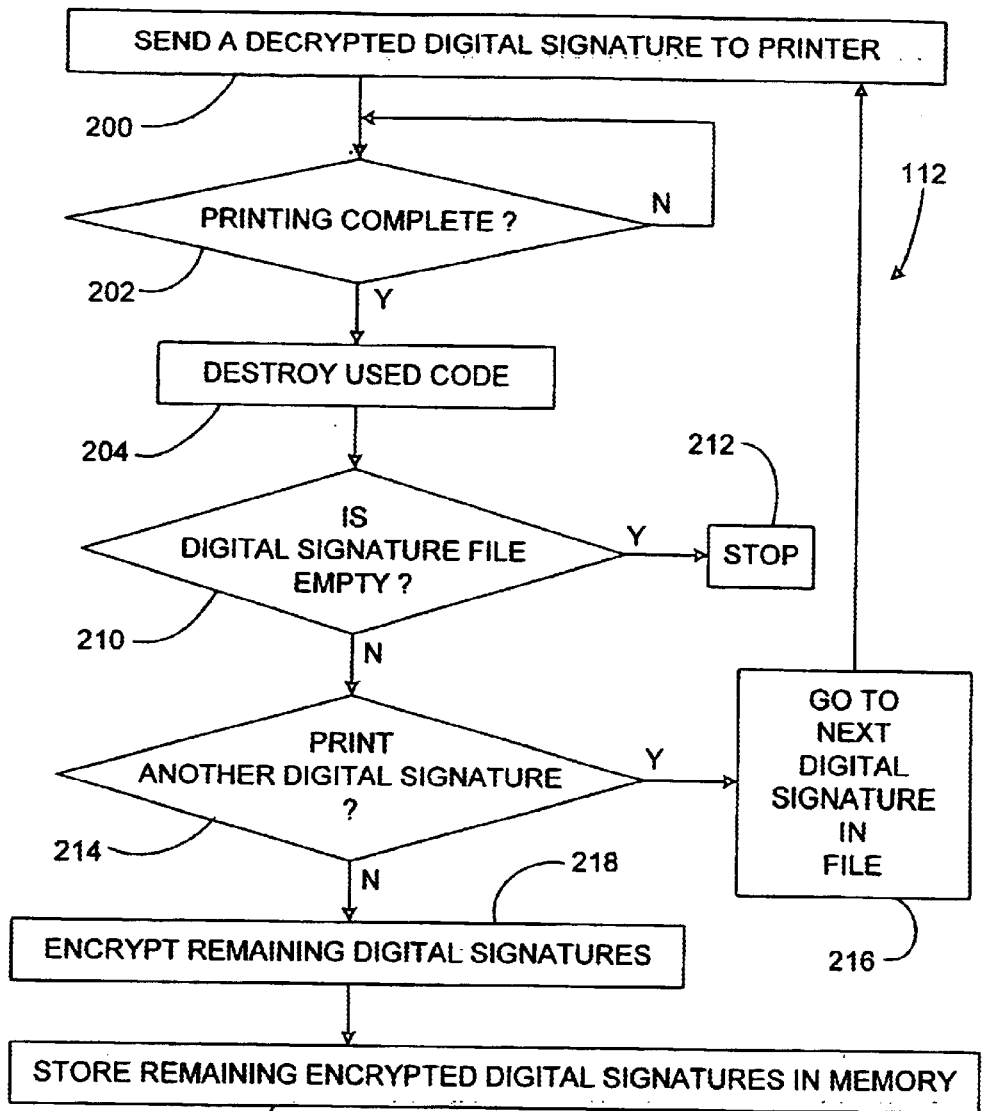
FIG. 6 is a flow chart diagram illustrating steps involved in printing the product indicia securely at the indicia application location according to the present invention.

A preferred method of securely printing the indicia at the indicia application location (step 112) is illustrated in FIG. 6 and will be discussed in detail in conjunction with FIG. 4. The secure printing begins at step 200, wherein the processor 154 sends one of the product indicia or digital signatures in the digital signature file 162 to the printing device 160, such as a laser printer or an ink jet printer. After sending the indicia to the printing device 160, the processor 154 monitors the printing process to ensure that the printing process is progressing properly at step 202. If the printing process exceeds a predetermined time interval (not shown), the processor 154 concludes that either a hardware problem exists or someone is attempting to intercept, tamper with, or otherwise steal a valid product indicia, and the processor 154 provides an indication of such status to a user or a security personnel, as may be desired, and discontinues the printing process 112.

If the printing of the indicia is completed within the predetermined time interval at step 202 (YES), the processor 154 destroys the used indicia at step 204. According to a preferred embodiment of the present invention, destroying the used code means to overwrite the data location in the digital signature file 162 within the read/write memory 156 where the used indicia resides so that the used indicia cannot be used again. One exemplary way of "destroying" the used indicia is illustrated in FIGS. 7a and 7b.

Figure 7A:
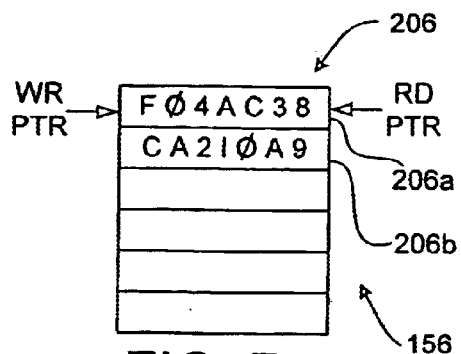
FIGS. 7a and 7b are block diagrams illustrating the reading data from and writing data to a read/write type memory according to the-present invention.
Figure 7B:
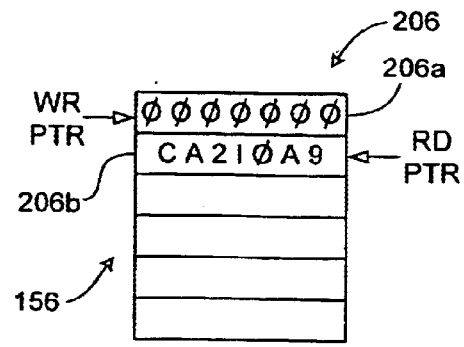

FIGS. 7a and 7b are block diagrams which illustrate a plurality of memory locations 206 in the read/write memory 156, wherein an exemplary product indicia "F04AC38" is located therein in hexadecimal form at a first memory location 206a. When the processor 154 sends a product indicia to the printing device 160, the processor 154 selects the indicia at the memory location at which the read pointer (RD PTR) presently points (location 206a). After transferring the indicia to the printing device 160, the read pointer moves to the "next" memory location 206b, while the write pointer (WR PTR) still points to the previous data location 206a. Subsequently, the processor 154 destroys the used product indicia "F04AC38" by overwriting the data location 206a associated with the write pointer (WR PTR) with data that does not correspond to any valid product indicia. Preferably, such overwrite data is a null data set, as illustrated in FIG. 7b, however, the overwrite data may vary as may be desired. After the overwriting is complete, the write pointer is incremented to the next data location 206b. According to a preferred embodiment of the present invention, the next data location is the next incremental address in the read/write memory 156. Alternatively, the "next" data location may correspond to another address as dictated by the configuration of the processor 154 and/or the configuration of the digital signature file 162, as may be desired.

Returning to FIG. 6, after the used product indicia is "destroyed" at step 204, the processor 154 queries whether the digital signature file 162 is empty at step 210. If the processor 154 determines that all the indicia have been printed (YES), the processor 154 discontinues the process 112 at step 212 and sends a message to the user that the digital signature file 162 has been depleted and a new digital signature file 162 is needed to continue the printing process. Alternatively, if the digital signature file 162 is not empty (NO), the processor 154 queries whether another product indicia is to be printed at step 214. Typically, the processor 154 will default to a YES response to the query of step 214 unless a user indicates via an input peripheral (not shown) that the printing process must end. Absent such an indication, the process 112 continues to step 216 by identifying the next indicia in the digital signature file 162, for example, by identifying the location of the read pointer of FIGS. 7a and 7b. The processor 154 then repeats the steps 200–214 wherein the indicia are successively printed until an indication is provided at step 214 that the printing must stop (NO). Typically, this occurs at the end of a work shift when the digital signature file 162 is not empty, but the printing process 112 nevertheless must stop.

When an indication is provided to discontinue printing at step 214, the remaining indicia in the digital signature file 162 are re-encrypted by the processor 154 using an encryption key within the private key file 164 at step 218 and the encrypted indicia again are stored in the read/write memory 156 at step 220. Consequently, it is preferred that the private key file 164 contain both the private and public encryption keys in the public/private key pair and that the processor 154 use the code-protected memory 158 to decrypt the private key file 164 to effectuate the encryption of the digital signature file 162 at step 218.

As has been shown in FIGS. 3–7b, the present invention provides a system and method of securing product indicia at an indicia application location. The private encryption key which is used to decrypt the digital signature file is itself encrypted and the key used to decrypt the encrypted private key is embedded within the hardware of the system at the indicia application location. The embedded key cannot be read, deciphered or reverse-engineered without destroying the key and thus serves to uniquely associate a digital signature file with a specific indicia application location. Further security features include an encrypted logfile which is used to identify duplicate indicia and an overwrite feature used during the indicia application process which destroys used indicia and thus prohibits indicia from being duplicated or misused after being printed or otherwise utilized.

According to yet another embodiment of the present invention, another method of securing product indicia at the indicia application location is disclosed in conjunction with FIGS. 8, 9, 10a and 10b and is designated at reference numeral 300. The method 300 includes the detailed steps taken to secure indicia at an indicia application location such as a cigarette wholesale distribution site. The method 300 will be described, for example, in conjunction with the system 150 of FIG. 4 in an example where cigarette tax stamps are applied to the cigarettes to signify that the appropriate tax associated with the cigarettes has been paid. It should be understood, however, that the present invention is applicable to other product indicia applications and such applications are contemplated as falling within the scope of the present invention.

The method 300 begins at step 302 and proceeds to step 304, at which point the processor 154 queries whether the logfile 166 exists within the read/write memory 156. If the processor 154 cannot find the logfile 166 (NO), then the processor 154 discontinues the process 300 at step 306. If, however, the processor 154 does find the logfile 166 in the read/write memory 156 (YES), the processor 154 continues to step 308 and queries whether a ppkeyfile exists in the read/write memory 156. In this exemplary embodiment of the present invention, the ppkeyfile is the public/private key file 164 of FIG. 4. If the processor 154 does not find the ppkeyfile 164 (NO), the process 300 is discontinued at step 310.

If the processor 154 does find the ppkeyfile 164 at step 308 (YES), the method 300 proceeds to step 312 and the processor 154 decrypts the ppkeyfile 164 using an encryption key within the code-protected unit 158, preferably a hardware embedded key that exists within an instruction set which is burned into a read-only memory device. The processor 154 then analyzes the decrypted ppkeyfile 164 at step 314 to determine whether the ppkeyfile 164 is valid, for example, by looking at the ppkeyfile 164 and determining whether the decryption worked properly. For example, if the decryption produces garbage data in the ppkeyfile 164 (NO), then the processor 154 determines that the ppkeyfile 164 is invalid (e.g., the wrong file or the file has been tampered with) and the processor 154 discontinues the process 300 at step 316. If, however, the decryption properly produces the encryption key (YES), then the ppkeyfile 164 is valid and the process 300 continues to step 318.

The decryption step 318 is performed by the processor 154 using a code-protected encryption key, preferably one that is embedded into the hardware of the system 150, such as a mask programmed read-only memory device of unit 158. The processor 154 then analyzes the decrypted logfile 166 at step 320 to determine whether the logfile 166 is valid, for example, by looking at the filename, the latest date in the logfile or analyzing other data unique to the file such as the version number or symbol to determine whether the logfile 166 has been tampered with. If the processor 154 determines that the logfile 166 is not valid (NO), the processor 154 discontinues the process 300 at step 322, otherwise (YES), the method 300 continues to step 324.

At step 324, the processor 154 determines whether an initialization file (inifile) is present. The inifile provides basic "bookkeeping" type functions such as saving the addresses of the read pointer and write pointer, etc. If the file containing the encrypted product indicia (the stampfile) is a new file, the inifile does not exist (NO), and the processor 154 leads a user through a number of steps to set up the initialization file. First, at step 326 the processor 154 asks the user to enter the new stampfile name and then the processor untars or unbundles the stampfile at step 328 (if the stampfile 162 and the ppkeyfile 164 associated therewith are sent to the application location together in a single bundled file form). The processor 154 then saves the stampfile name in the inifile at step 330. Lastly, the processor 154 signs the encryption key contained within the stamp tarfile at step 332 to provide proof that the stamp tarfile was received and unbundled in the event that an unscrupulous wholesaler subsequently claims that the file was lost or was never received.

If the inifile already exists at step 324 (YES), then the stampfile 12 is not a new file and the processor 154 proceeds to decrypt the stampfile 162 using the encryption key within the ppkeyfile 164 at step 334, wherein the decrypted stampfile is called the "clearfile." Similarly, even if the stampfile 162 is new, after it is unbundled and the key is signed, the stampfile 162 is decrypted at step 334. If the processor 154 notes that the stampfile is new at step 336, the processor 154 checks to see whether the logfile 166 is valid and if not (NO), discontinues.the.process at step 338. If, however, the logfile 166 is valid (YES), the processor 154 updates the logfile 166 by inputting therein a date stamp of the stampfile at step 340.

After the logfile 166 has been updated at step 340, the processor 154 re-encrypts the logfile 166 using the key in the ppkeyfile 164 at step 342 to prevent a user from manipulating the logfile 166. In addition, since the ppkeyfile 164 has already been used to decrypt the stampfile 162 to the clearfile, the ppkeyfile 164 is re-encrypted by the code-protected key at step 344. The processor 154 then sets the read and write (erase) pointers at step 346 to begin the printing of the decrypted tax stamps within the clearfile at step 348.

Figure 8:
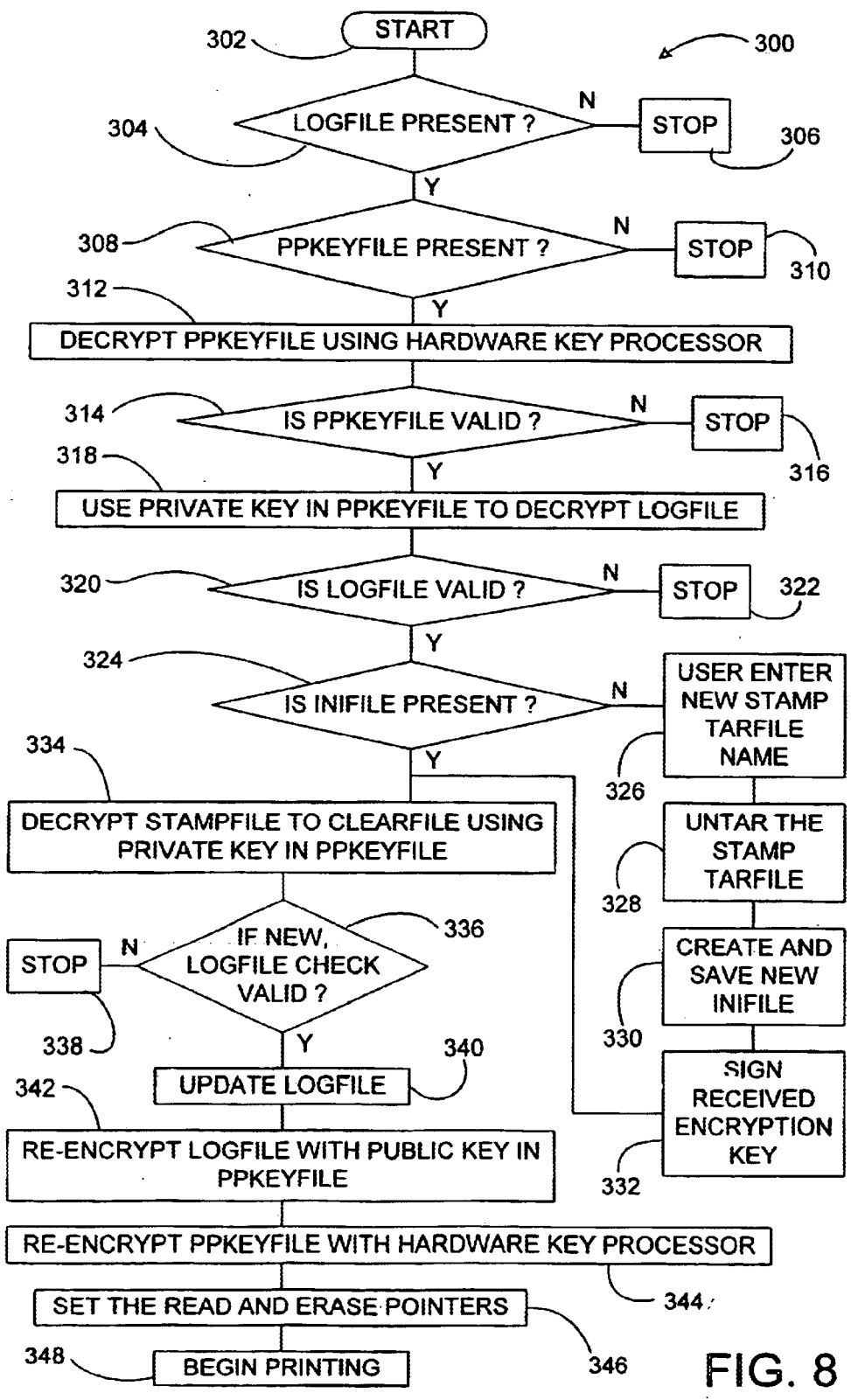
FIG. 8 is a flow chart diagram illustrating steps involved in processing the product indicia securely at the indicia application location according to another exemplary embodiment of the present invention.
Figure 9:
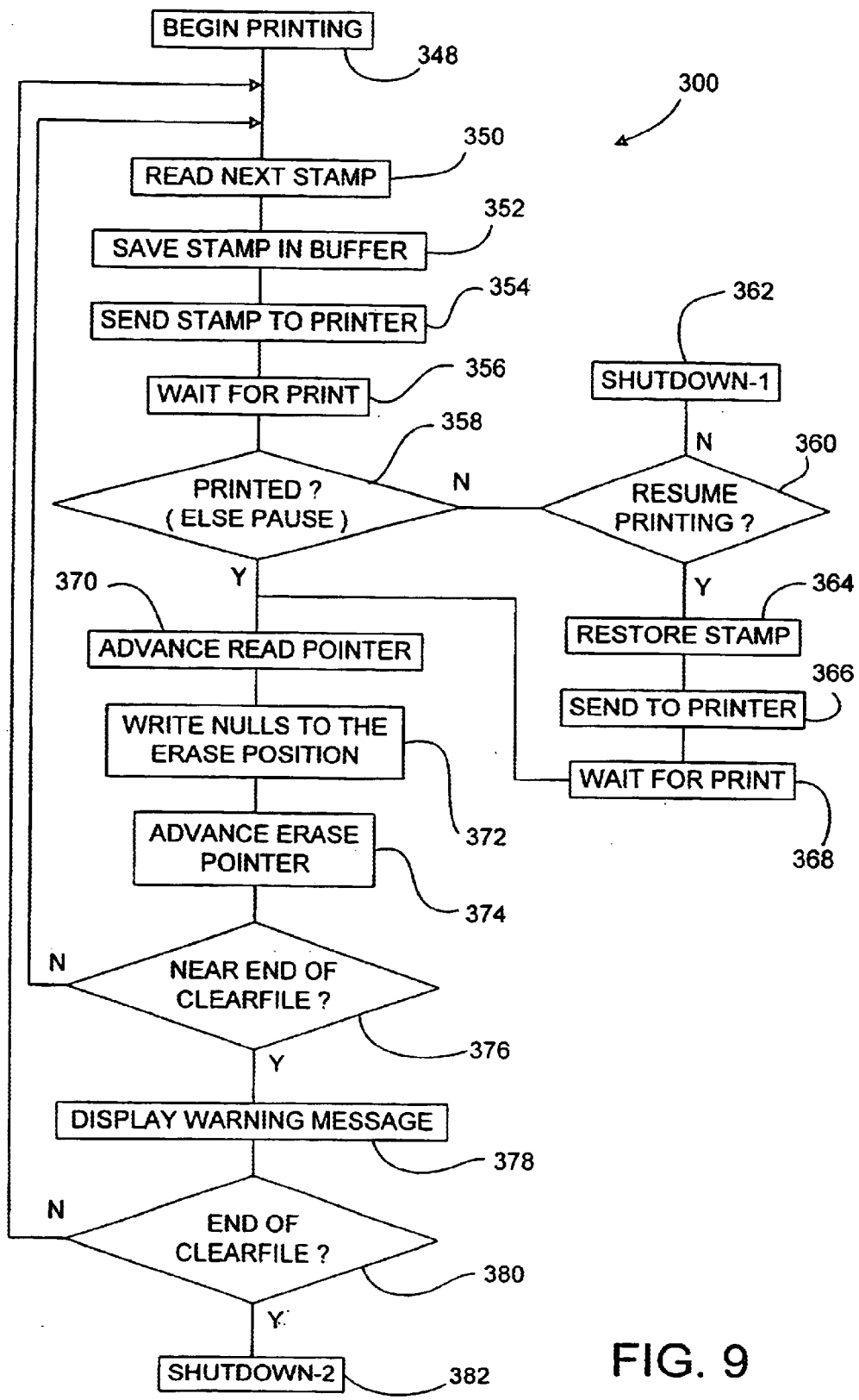
FIG. 9 is a flow chart illustrating steps involved in printing the product indicia securely according to another exemplary embodiment of the present invention.

As can be seen in the preferred method 300 of FIG. 8, the processor 154 uses encryption keys in the code-protected hardware encryption key and dedicated processor 158 to decrypt the ppkeyfile 164 and a key in the ppkeyfile 164 to decrypt the logfile 166 to provide additional security for the tax stamps at the wholesale distribution site. The present invention also provides further security features in the printing process 348 of FIG. 9. In printing the tax stamps (applying the stamps to the goods) which reside in the clearfile, the processor 154 reads the "next" tax stamp as dictated by the read pointer at step 350, saves the tax stamp in a buffer at step 352 and sends the tax stamp to the printing device 160 at step 354.

Once the processor 154 sends the tax stamp to the printing device 160, the processor 154 waits a predetermined period of time at step 356 to check whether the tax stamp printed properly (358). If the tax stamp did not print (NO) at step 358, the user is provided an option to try again at step 360. If the user indicates NO at step 360, the method 300 initiates a mid-printing shutdown procedure (shutdown 1) at step 362. If, however, the user or a default setting in the processor 154 indicates to try to print again at step 360 (YES), the tax stamp is "restored" at step 364 by recalling the tax stamp from the buffer and re-sending it to the printer at step 366. The processor 154 again waits a predetermined time at step 368 and repeats steps 358–368 if necessary, otherwise the method 300 proceeds to step 370 at which point the read pointer is advanced to the address of the next tax stamp in the clearfile.

The processor 154 then writes a null data set to the erase position which is the address dictated by the write pointer at step 372. The erase or write pointer is then advanced to the next tax stamp at step 374. Steps 370–374 provide an additional security feature of destroying used tax stamps by overwriting the data location in the clearfile so that used codes cannot be subsequently duplicated.

The method 300 continues at step 376, wherein the processor 154 queries whether the read pointer is nearing the end of the clearfile, that is whether the system 150 is getting close to finishing the clearfile so that all the tax stamps have been printed. If the read pointer is near the end of the clearfile (YES) (wherein "near" may be defined by the user and may be a function of the size of the clearfile when full), a warning message is displayed to a user or automatically transmitted electronically to appropriate personnel either at the wholesale site or elsewhere at step 378 so that additional tax stamps can be ordered or downloaded if needed. If the answer to the query at step 376 is NO, the method 300 returns to step 350 and the process for printing the next tax stamp continues. Likewise, after displaying the warning message, if the clearfile is not empty (NO) at step 380, the process 300 continues to step 350. If, however, the clearfile is empty at step 380 (YES), all the tax stamps in the clearfile have been printed and an end-file shutdown procedure (shutdown 2) proceeds at step 382.

The shutdown procedures 362 and 382 of FIGS. 10a and 10b, respectively, provide a secure procedure for discontinuing the printing process when the clearfile either still contains valid tax stamps or is empty. The shutdown procedure 362 of FIG. 10a is directed to a method of discontinuing the printing process when the clearfile still contains one or more valid tax stamps. The procedure 362 begins by sending a blank stamp to the printing device 160 to ensure that no valid tax stamps are in the queue of the printing device at step 392. The processor 154 then decrypts the ppkeyfile 164 at step 394 and the logfile 166 at step 396 with encryption keys in the code-protected unit 158 and ppkeyfile 164, respectively. The processor 154 then updates the logfile 166 at step 398 by inserting a date stamp indicating when the printing was discontinued. Subsequently, the processor 154 changes the logfile version number or symbol via the hardware code-protected unit 158 and re-encrypts the logfile 166 via a key within the ppkeyfile 164 at step 400.

The processor 154 continues the shutdown procedure 362 at step 406 by opening the inifile and updating it to reflect at least the addresses of the read and write pointers. The processor 154 then re-encrypts the clearfile back to the stampfile using the decrypted key within the ppkeyfile 164 at step 408. The processor 154 then overwrites the clearfile memory, thus destroying the memory locations at which previous tax stamps resided at steps 410 and 412, thus preventing valid tax stamps from being duplicated. The processor 154 then re-encrypts the ppkeyfile 164 at step 414 using the key within the code-protected unit 158 to conclude the shutdown procedure 362 at step 416.

The shutdown procedure 382 of FIG. 10b relates to shutting down the printing process securely after all the tax stamps in the clearfile have been utilized. The procedure 382 starts at step 392 and continues to step 400 in a manner similar to the procedure 362 of FIG. 10a. That is, the processor 154 sends a blank stamp to the printing device 160 to ensure the printing queue is empty, decrypts the ppkeyfile 164 and the logfile 166 using the appropriate encryption keys, respectively, and updates the logfile 166 (including the logfile version number or symbol).

Anything remaining in the clearfile (not the tax stamps) is re-encrypted at step 408 and the clearfile memory is overwritten to delete the clearfile at steps 410 and 412. The processor 154 then deletes all files in the read/write memory 156 having the stampfile name at step 420 and deletes the inifile at step 422. Lastly, the processor 154 re-encrypts the ppkeyfile 164 at step 414 and ends the procedure 382 at step 424.

In the above description, the entire stampfile is encrypted and upon decryption produces a clearfile which contains indicia in ready-to-print form. In another alternative embodiment of the present invention, the clearfile contains a list of indicia which are each further encrypted by, for example, the public key portion of the ppkeyfile. In such an embodiment, prior to step 350 of FIG. 9, a decryption of the next indicia must occur prior to "reading" the indicia. In yet another alternative embodiment of the present invention, each of the indicia are individually decrypted to their ready-to-print form to thereby limit the number of readable indicia to one (1) at any point in time. Other embodiments in the spirit of the above alternative embodiments are also contemplated as falling within the scope of the present, invention.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method of securing one or more product indicia for use in authenticating products or collecting a tax, comprising the steps of:

generating one or more product indicia;

encrypting the one or more product indicia with a public encryption key;

transferring the one or more product indicia to an indicia application location for application of the one or more product indicia to one or more products, respectively; and processing the one or more product indicia securely while applying the one or more product indicia to the one or more products, thereby preventing a tampering, misuse or theft of one or more product indicia at the indicia application location, wherein processing the one or more indicia securely while applying the one or more product indicia to the one or more products comprises:

decrypting an encrypted private key associated with the public encryption key used to encrypt the one or more product indicia using a code-protected key at the indicia application location;

decrypting the one or more product indicia using the private key; and applying the one or more indicia which have been decrypted to the one or more products, respectively, and wherein the processing step further comprises:

decrypting an encrypted logfile associated with the indicia application location, wherein the logfile includes at least one of each group of one or more product indicia which have been processed previously and applied to products at the indicia application location or other locations, and wherein the at least one of each group of one or more product indicia forms an indicia history file;

comparing the decrypted one or more product indicia which were decrypted with the private key to the indicia history list; and determining whether the decrypted one or more product indicia are valid using the comparison.

2. The method of claim 1, wherein the one or more product indicia comprise a bar code, an alphanumeric identification code or a two-dimensional digital signature.

3. The method of claim 1, wherein the one or more product indicia are generated at a product manufacturing location.

4. The method of claim 1, wherein the indicia transfer location comprises a wholesale distribution location.

5. The method of claim 1, wherein transferring the one or more product indicia to an indicia transfer location comprises transmitting the one or more product indicia through a computer network or through a modem to the indicia application location.

6. The method of claim 1, wherein the code-protected key comprises an encryption key residing in a read-only memory.

7. The method of claim 6, wherein the read-only memory is a mask programmed read-only memory device, wherein the key is burned into the memory device and the key cannot be analyzed or deciphered without rendering the read-only memory device inoperable.

8. The method of claim 1, wherein encrypted logfile is decrypted using a private key associated with the encrypted private key at the indicia application location.

9. The method of claim 1, wherein the encrypted logfile is decrypted using a code-protected key at the indicia application location.

10. The method of claim 1, wherein the logfile further includes a name of each file associated with each group of one or more product indicia which have previously been processed, wherein the names of each file forms a filename list, and wherein the processing step further comprises:

comparing a name of a file associated with the decrypted one or more product indicia which were encrypted with the private key to the filename list; and determining whether the decrypted one or more product indicia are valid using the comparison.

11. The method of claim 1, wherein the logfile further includes a version number or symbol which is changed each time the logfile is re-encrypted, and wherein the processing step further comprises:

comparing the version number or symbol to an expected version number or symbol; and discontinuing the processing if the version number or symbol does not match the expected version number or symbol.

12. The method of claim 11, wherein the version number or symbol is changed using a code-protected processor associated with the code-protected key.

13. The method of claim 1, wherein applying the one or more product indicia to the one or more products comprises:

transferring one of the one or more decrypted product indicia to a printing device; and destroying a copy of the one of the one or more decrypted product indicia in a memory device at the indicia application location after the transfer to the printing device is complete.

14. The method of claim 13, wherein the step of destroying the copy comprises writing over a data location in the memory at which the copy resides with other data which does not correspond to the copy.

15. The method of claim 14, wherein the other data comprises a null data set.

16. A method of securing one or more digital signatures for use in collecting a tax, comprising the steps of:

generating one or more digital signatures;

encrypting the digital signatures using a public encryption key;

transferring the encrypted digital signatures to a print location; and printing the digital signatures securely at the print location, wherein the secure printing step prevents a theft or misuse of the digital signatures at the print location, and wherein the encrypted digital signatures form a digital signature file and wherein printing the digital signatures securely comprises:

maintaining an encrypted private key file at the print location, wherein the private key file includes a private encryption key which is uniquely associated with the public encryption key used to encrypt the digital signatures, decrypting the encrypted private key file with a code-protected encryption key which is maintained in a mask programmed read-only memory at the print location;

decrypting the encrypted digital signature file using the decrypted private encryption key; and transferring the decrypted digital signatures to a printing device.

17. The method of claim 16, wherein printing the digital signatures securely comprises:

decrypting the digital signatures with a private encryption key which is associated with the public encryption key, wherein the private encryption key is encrypted when not in use and is maintained in a secure location at the print location; and transferring the decrypted digital signatures to a printing device.

18. The method of claim 17, wherein the secure location comprises a code-protected memory location.

19. The method of claim 18, wherein the code-protected memory location comprises a mask programmed read-only memory which cannot be analyzed or deciphered without rendering the read-only memory device inoperable.

20. The method of claim 17, wherein the private encryption key is uniquely associated with the public encryption key such that the private encryption key is the only key which can decrypt the encrypted digital signatures.

21. The method of claim 16, wherein printing the digital signatures securely further comprises:

maintaining an encrypted logfile at the print location, wherein the logfile includes use information relating to the decryption of one or more digital signature files and includes previous digital signature information which includes at least one digital signature from each previously printed digital signature file;

decrypting the encrypted logfile using the decrypted private encrypted key at the print location;

comparing the previous digital signature information in the decrypted logfile to the decrypted digital signature file; and determining whether the decrypted digital signatures are valid using the comparison.

22. The method of claim 16, wherein printing the digital signatures securely further comprises:

maintaining an encrypted logfile at the print location, wherein the logfile includes use information relating to the decryption of one or more digital signature files and includes previous digital signature information which includes at least one digital signature from each previously printed digital signature file;

decrypting the encrypted logfile using a code-protected encryption key which is maintained in a mask programmed read-only memory at the print location;

comparing the previous digital signature information in the decrypted logfile to the decrypted digital signature file; and determining whether the decrypted digital signatures are valid using the comparison.

23. The method of claim 16, wherein transferring the digital signatures to the printing device comprises:

sending a digital signature from a memory location in the digital signature file to the printing device;

overwriting the memory location with other data that does not correspond to a valid digital signature so as to destroy the digital signature after the digital signature has been printed;

determining whether another digital signature is to be sent to the printing device; and encrypting any remaining digital signatures in the digital signature file and if no more digital signatures are to be sent to the printing device.

24. A system for securing one or more product indicia for use in authentication of products or collecting a tax, comprising:

a processor;

a read/write memory associated with the processor, wherein the read/write memory stores therein a product indicia file containing one or more product indicia in an encrypted form and a public/private key file containing a public/private encryption key pair in an encrypted form which is associated with a public encryption key which is used to encrypt the product indicia in the product indicia file;

a code-protected device associated with the processor, wherein the code-protected device stores therein a code-protected encryption key which is used to encrypt and decrypt the private encryption key in the read/write memory, and wherein the code-protected encryption key can not be deciphered without rendering the code-protected memory inoperable; and a printing device associated with the processor, wherein the processor is configured to utilize the code-protected encryption key to decrypt the private encryption key, use the decrypted private encryption key to decrypt the one or more product indicia in the product indicia file, and transfer the decrypted one or more product indicia to the printing device for printing thereof, and wherein the read/write memory further stores therein a logfile which contains use information relating to the decryption of one or more product indicia files and contains previous product indicia information which includes at least one product indicia from each previously printed indicia file, and wherein the processor is further configured to utilize a key in the public/private key file to decrypt the logfile and use the decrypted logfile to determine whether the decrypted product indicia are valid.

25. The system of claim 24, wherein the code-protected device comprises a mask programmed read-only memory device.

26. The system of claim 24, wherein the logfile contains a version number or symbol, and wherein the version number or symbol is changed each time the logfile is re-encrypted, thereby allowing the logfile to be later verified by checking whether the version number or symbol matches an expected version number or symbol.

27. The system of claim 24, wherein the code-protected device further comprises a dedicated processor associated with the code-protected encryption key.

28. A system for securing one or more product indicia for use in authentication of products or collecting a tax, comprising:

a processor;

a read/write memory associated with the processor, wherein the read/write memory stores therein a product indicia file containing one or more product indicia in an encrypted form and a public/private key file containing a public/private encryption key pair in an encrypted form which is associated with a public encryption key which is used to encrypt the product indicia in the product indicia file;

a code-protected device associated with the processor, wherein the code-protected device stores therein a code-protected encryption key which is used to encrypt and decrypt the private encryption key in the read/write memory, and wherein the code-protected encryption key can not be deciphered without rendering the code-protected memory inoperable; and a printing device associated with the processor, wherein the processor is configured to utilize the code-protected encryption key to decrypt the private encryption key, use the decrypted private encryption key to decrypt the one or more product indicia in the indicia file, and transfer the decrypted one or more product indicia to the printing device for printing thereof, and wherein the processor is further configured to overwrite a memory location associated with product indicia which was transferred to the printing device with data that does not correspond to a valid product indicia so as to destroy the product indicia after it has been printed.

29. The system of claim 28, wherein the processor is configured to overwrite the memory location with a null data set.

30. A method of securing one or more product indicia for use in authenticating products or collecting a tax, including generating one or more product indicia; and characterized in encrypting the one or more product indicia with a public encryption key;

transferring the one or more product indicia to an indicia application location for application of the one or more product indicia to one or more products, respectively; and processing securely the one or more product indicia while applying the one or more product indicia to the one or more products, thereby preventing a tampering, misuse or theft of one or more product indicia at the indicia application location, and wherein the processing securely step is further characterized in using information in an encrypted logfile associated with one or more groups of product indicia to prevent subsequent uses of the same logfile and to determine validity of the product indicia, including decrypting the encrypted logfile;

checking the information for validity; and determining whether the one or more product indicia are valid using the checking.

31. The method of claim 30, further characterized in that the logfile further includes as at least part of the information a version number or symbol which is changed each time the logfile is re-encrypted, and wherein the processing step further comprises:

comparing the version number or symbol to an expected version number or symbol; and discontinuing the processing if the version number or symbol does not match the expected version number or symbol.

32. The method of claim 31, further characterized in that the version number or symbol is changed using a code-protected processor associated with a code-protected key.

33. The method of claim 30, wherein the step of using information is further characterized in using a random number or algorithm.

34. The method of claim 30, wherein the using information step is further characterized in decrypting the encrypted logfile associated with the indicia application location, wherein the logfile includes at least one of each group of one or more product indicia which have been processed previously and applied to products at the indicia application location or other locations, and wherein the at least one of each group of one or more product indicia forms an indicia history file;

and said checking the information for the validity is further characterized in comparing the decrypted one or more product indicia which were decrypted with a private key to the indicia history file; and said determining whether the one or more product indicia are valid using the checking is further characterized in using said comparison.

35. The method of claim 33, wherein processing the one or more indicia securely while applying the one or more product indicia to the one or more products is further characterized in decrypting an encrypted private key associated with the public encryption key used to encrypt the one or more product indicia using a code-protected key at the indicia application location;

decrypting the one or more product indicia using a private key; and applying the one or more indicia which have been decrypted to the one or more products, respectively.

36. The method of claim 35, further characterized in that the encrypted logfile is decrypted using a private key associated with the encrypted private key at the indicia application location.

37. The method of claim 30, further characterized in that the encrypted logfile is decrypted using a code-protected key at the indicia application location.

38. The method of claim 30, wherein applying the one or more product indicia to the one or more products is further characterized in transferring one of the one or more decrypted product indicia to a printing device; and destroying a copy of the one of the one or more decrypted product indicia in a memory device at the indicia application location after the transfer to the printing device is complete.

39. The method of claim 30, wherein transferring the one or more product indicia to an indicia transfer location further characterized in transmitting the one or more product indicia through a computer network or through a modem to the indicia application location.

40. The method of claim 30, further characterized in that the one or more product indicia comprise a bar code, an alphanumeric identification code or a two-dimensional digital signature, the one or more product indicia are generated at a product manufacturing location, and the indicia transfer location comprises a wholesale distribution location.

41. The method of claim 30, further characterized in that the encrypted logfile is associated with the indicia application location or print location.

42. A method of securing one or more digital signatures for use in collecting a tax, characterized in comprising the steps of:

generating one or more digital signatures;

encrypting the digital signatures using a public encryption key;

transferring the encrypted digital signatures to a print location; and printing the digital signatures securely at the print location, wherein the secure printing step prevents a theft or misuse of the digital signatures at the print location, and wherein printing the digital signatures securely is further characterized in maintaining an encrypted logfile, wherein the logfile includes information for preventing subsequent use of the same logfile, and wherein the logfile is usable for determining whether the digital signatures are valid.

43. The method of claim 42, further characterized in that the encrypted digital signatures form a digital signature file and further characterized in that the printing the digital signatures securely comprises:

maintaining an encrypted private key file at the print location, wherein the private key file includes a private encryption key which is uniquely associated with the public encryption key used to encrypt the digital signatures, decrypting the encrypted private key file with a code-protected encryption key which is maintained in a mask programmed read-only memory at the print location;

decrypting the encrypted digital signature file using the decrypted private encryption key; and transferring the decrypted digital signatures to a printing device.

44. The method of claim 43, wherein the information is further characterized in use information relating to the decryption of one or more digital signature files and includes previous digital signature information which includes at least one digital signature from each previously printed digital signature file; and wherein the printing the digital signatures securely is further characterized in decrypting the encrypted logfile using the decrypted private encrypted key at the print location;

comparing the previous digital signature information in the decrypted logfile to the decrypted digital signature file; and determining whether the decrypted digital signatures are valid using the comparison.

45. The method of claim 43, wherein the information is further characterized in use information relating to the decryption of one or more digital signature files and includes previous digital signature information which includes at least one digital signature from each previously printed digital signature file; and wherein the printing the digital signatures securely is further characterized in decrypting the encrypted logfile using a code-protected encryption key which is maintained in a mask programmed read-only memory at the print location;

comparing the previous digital signature information in the decrypted logfile to the decrypted digital signature file; and determining whether the decrypted digital signatures are valid using the comparison.

46. The method of claim 43, wherein transferring the digital signatures to the printing device is further characterized in sending a digital signature from a memory location in the digital signature file to the printing device;

overwriting the memory location with other data that does not correspond to a valid digital signature so as to destroy the digital signature after the digital signature has been printed;

determining whether another digital signature is to be sent to the printing device; and encrypting any remaining digital signatures in the digital signature file and if no more digital signatures are to be sent to the printing device.

47. The method of claim 42, wherein printing the digital signatures securely is further characterized in decrypting the digital signatures with a private encryption key which is associated with the public encryption key, wherein the private encryption key is encrypted when not in use and is maintained in a secure location at the print location; and transferring the decrypted digital signatures to a printing device.

48. The method of claim 47, further characterized in that the secure location comprises a code-protected memory location.

49. The method of claim 42, further characterized in that the encrypted logfile is associated with the indicia application location or print location.

50. A system for securing one or more product indicia for use in authentication of products or collecting a tax, comprising:

a processor;

a read/write memory associated with the processor, wherein the read/write memory stores therein a product indicia file containing one or more product indicia in an encrypted form and a public/private key file containing a public/private encryption key pair in an encrypted form which is associated with a public encryption key which is used to encrypt the product indicia in the product indicia file;

code-protected device associated with the processor, wherein the code-protected device stores therein a code-protected encryption key which is used to encrypt and decrypt the private encryption key in the read/write memory, and wherein the code-protected encryption key cannot be deciphered without rendering the code-protected memory inoperable; and a printing device associated with the processor, wherein the processor is configured to utilize the code-protected encryption key to decrypt the private encryption key, use the decrypted private encryption key to decrypt the one or more product indicia in the product indicia file, and transfer the decrypted one or more product indicia to the printing device for printing thereof, and wherein the read/write memory further stores therein a logfile which contains use information relating to the decryption of one or more product indicia files and wherein the processor is further configured to utilize a key in the public private key file to decrypt the logfile and use the decrypted logfile to prevent re-use of the same logfile and to determine whether the decrypted product indicia are valid.

51. The system of claim 50, further characterized in that the logfile contains previous product indicia information which includes at least one product indicia from each previously printed indicia file.

52. The system of claim 51, wherein the logfile contains a version number or symbol, and wherein the version number or symbol is changed each time the logfile is re-encrypted, thereby allowing the logfile to be later verified by checking whether the version number or symbol matches an expected version number or symbol.

53. The system of claim 50, wherein the processor is further configured to overwrite a memory location associated with product indicia which was transferred to the printing device with data that .does not correspond to a valid product indicia so as to destroy the product indicia after it has been printed.

* * * * *

UNITED STATES PATENT AND TRADEMARK OFFICE
CERTIFICATE OF CORRECTION

PATENT NO. : 6,681,214 B1
DATED : January 20, 2004
INVENTOR(S) : Doljack

It is certified that error appears in the above-identified patent and that said Letters Patent is hereby corrected as shown below:

<u>Column 23,</u>
Line 19, replace "public private" with -- public/private --.

Signed and Sealed this

Fifteenth Day of June, 2004

JON W. DUDAS
*Acting Director of the United States Patent and Trademark Office*